(12) United States Patent
Hardin et al.

(10) Patent No.: US 8,651,524 B2
(45) Date of Patent: Feb. 18, 2014

(54) AIRBAG TRAJECTORY CONTROL ENVELOPE

(75) Inventors: Adam Hardin, Festus, MO (US); Peter L. Vigeant, Ste. Genevieve, MO (US)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 13/596,669

(22) Filed: Aug. 28, 2012

(65) Prior Publication Data

US 2013/0140799 A1 Jun. 6, 2013

Related U.S. Application Data

(60) Provisional application No. 61/567,092, filed on Dec. 5, 2011.

(51) Int. Cl.
*B60R 21/16* (2006.01)

(52) U.S. Cl.
USPC ........................................ 280/743.1

(58) Field of Classification Search
USPC ........................................ 280/742, 743.1, 739
See application file for complete search history.

(56) References Cited

U.S. PATENT DOCUMENTS

| | | | | |
|---|---|---|---|---|
| 5,348,343 A | * | 9/1994 | Hawthorn | 280/730.1 |
| 6,942,242 B2 | * | 9/2005 | Hawthorn et al. | 280/728.2 |
| 7,314,228 B2 | * | 1/2008 | Ishiguro et al. | 280/728.2 |
| 7,695,013 B2 | * | 4/2010 | Kakstis et al. | 280/743.1 |
| 8,408,596 B2 | * | 4/2013 | Matsunaga et al. | 280/743.1 |
| 2009/0152842 A1 | * | 6/2009 | Benny et al. | 280/728.3 |
| 2011/0109071 A1 | * | 5/2011 | Onda et al. | 280/743.1 |

* cited by examiner

*Primary Examiner* — Faye M. Fleming
(74) *Attorney, Agent, or Firm* — Carlson, Gaskey & Olds, P.C.

(57) ABSTRACT

An example trajectory control envelope includes a trajectory control envelope configured to receive an airbag and to control deployment of the airbag.

18 Claims, 8 Drawing Sheets

AIRBAG TRAJECTORY CONTROL ENVELOPE

CROSS-REFERENCE TO RELATED APPLICATIONS

This application claims priority to U.S. Provisional Application No. 61/567,092, which was filed on 5 Dec. 2011 and is incorporated herein by reference.

BACKGROUND

This disclosure relates generally to controlling an airbag deployment and, more particularly, to an airbag trajectory control envelope.

Airbags protect vehicle occupants as is known. Airbags are used together with other vehicle safety systems, such as seatbelts. Airbags are located in various areas of the vehicle.

An airbag is typically positioned behind an airbag cover. Inflating the airbag causes the airbag to move past the cover to a position suitable for absorbing forces.

SUMMARY

An example trajectory control envelope includes a trajectory control envelope configured to receive an airbag and to control deployment of the airbag.

An example airbag assembly includes an airbag, and a trajectory control envelope that receives the airbag. The trajectory control envelope configured to direct the airbag during deployment of the airbag.

An example method of airbag deployment control includes deploying an airbag, and directing the deployment of the airbag to a desired area using a trajectory control envelope.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
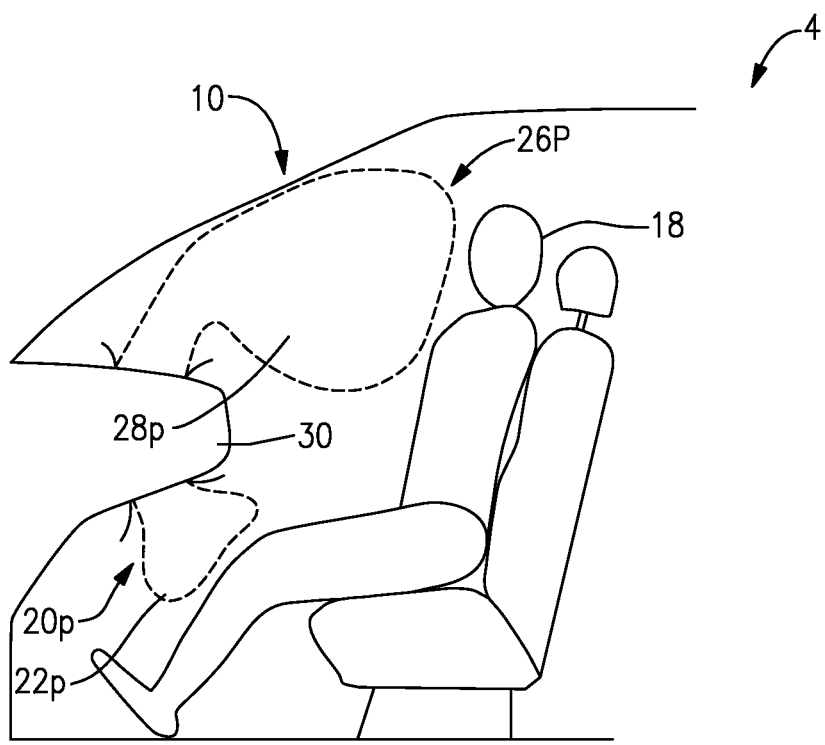
FIG. 1 shows a side view of a portion of an example airbag system within a vehicle.

Referring to FIG. 1, an airbag system 10 within a vehicle 14 protects an occupant 18 during a collision. The example airbag system 10 is a passenger side system that protects a passenger within the vehicle 14. The example airbag system 10 includes a knee airbag assembly 20p and a frontal airbag assembly 26p.

A knee airbag 22p of the knee airbag assembly 20p prevents the occupant 18 from striking a lower portion of an instrument panel 30 of the vehicle 14. A frontal airbag 28p of the frontal airbag assembly 26p prevents the occupant 18 from striking other portions of the instrument panel 30. Contact between the occupant 18 and the instrument panel 30 can injure the occupant 18, as is known.

Figure 2:
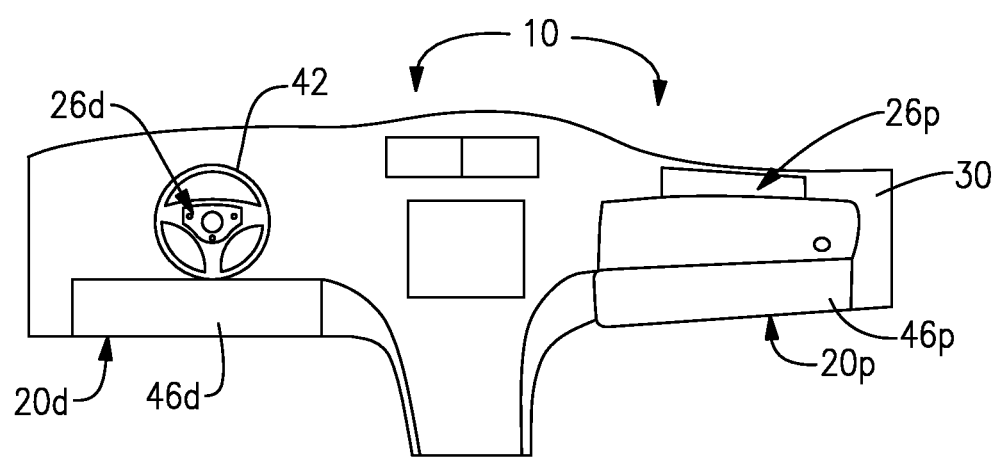
FIG. 2 shows a view of an instrument panel of the FIG. 1 vehicle.
Figure 3:
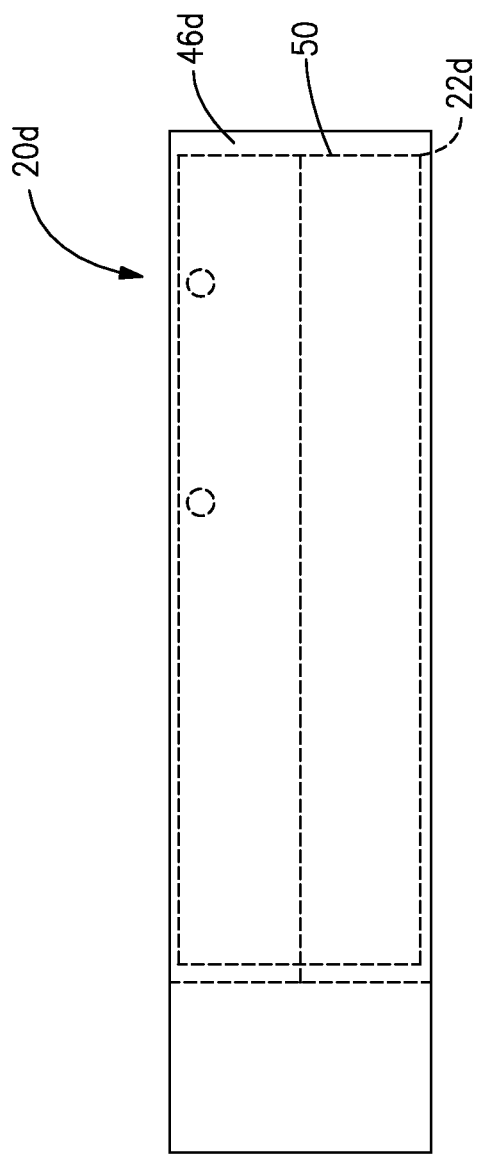
FIG. 3 shows a front view of a driver side knee airbag assembly within the FIG. 1 vehicle.
Figure 4:
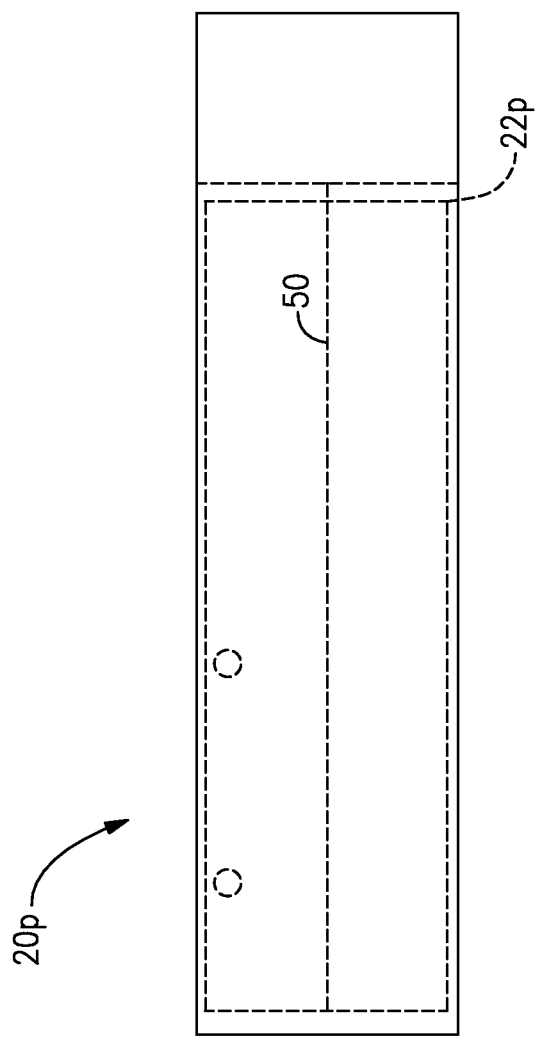
FIG. 4 shows a front view of a passenger side knee airbag assembly within the FIG. 1 vehicle.
Figure 5:
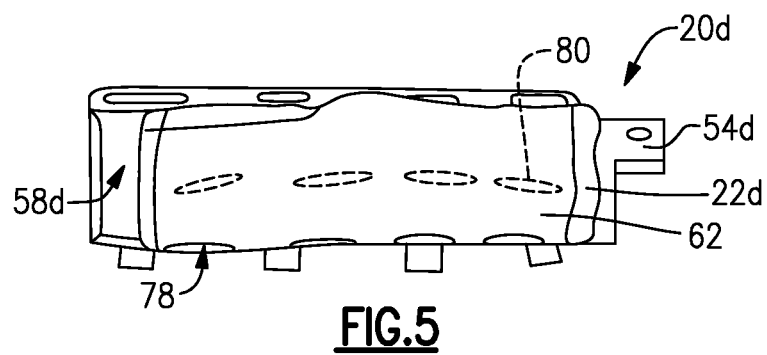
FIG. 5 shows the FIG. 3 driver side knee airbag assembly with the cover removed.
Figure 6:
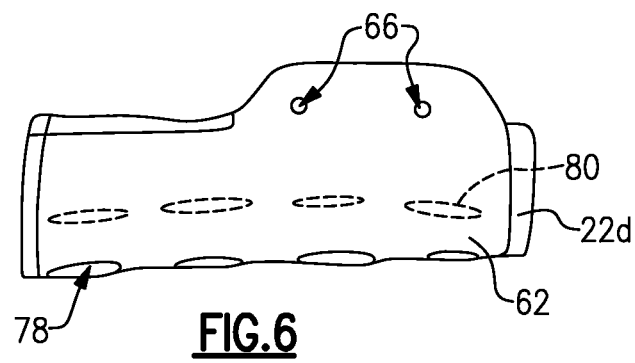
FIG. 6 shows the FIG. 5 driver side knee airbag assembly with the housing removed.
Figure 7:
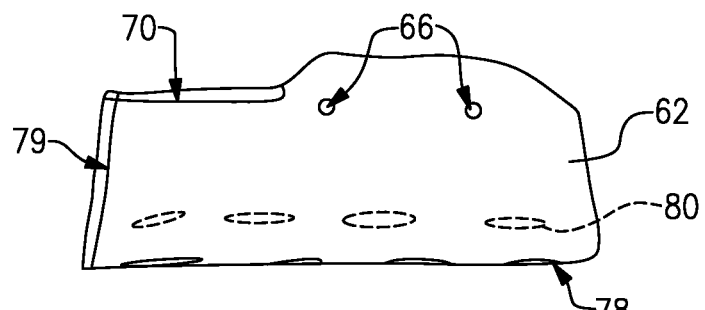
FIG. 7 shows a trajectory control envelope of the FIG. 3 driver side knee airbag assembly.
Figure 8:
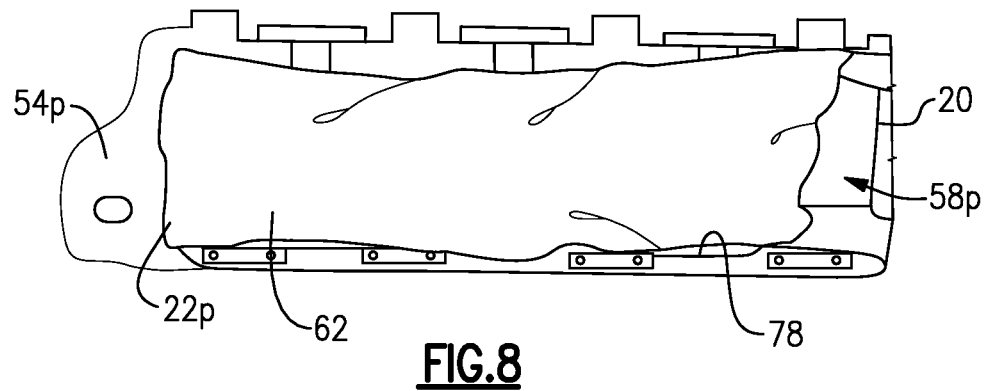
FIG. 8 shows the FIG. 4 passenger side airbag assembly with the cover removed.
Figure 9:
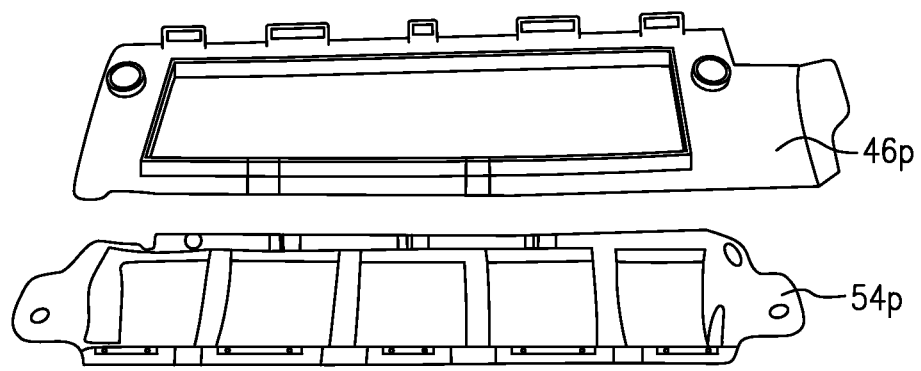
FIG. 9 shows the housing—and a backside view of the cover—of the FIG. 4 passenger side airbag assembly.
Figure 10:
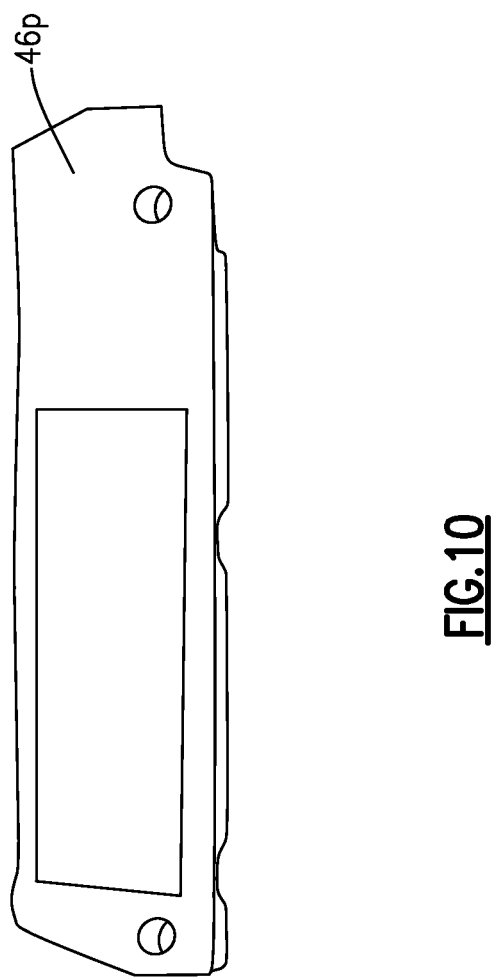
FIG. 10 shows a front view of the cover of the FIG. 4 passenger side airbag assembly.
Figure 11:
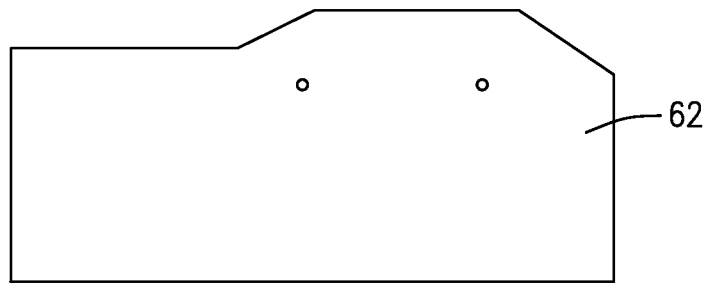
FIG. 11 shows a trajectory control envelope of the FIG. 3 passenger side airbag assembly in a folded position.
Figure 12:
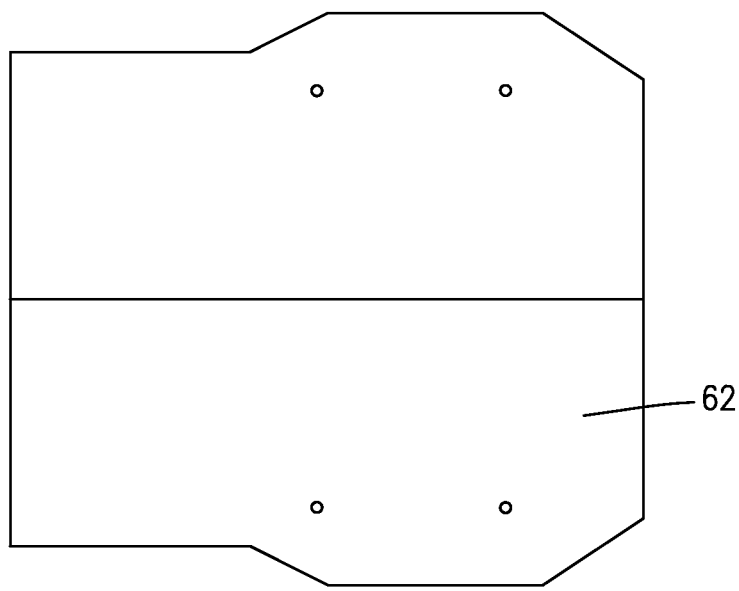
FIG. 12 shows a trajectory control envelope of the FIG. 3 passenger side airbag assembly in an unfolded position.

Referring to FIG. 2 with continuing reference to FIG. 1, the knee airbag assembly 20p and the frontal airbag 26p are held within the instrument panel 30. The instrument panel 30 holds other airbag assemblies of the airbag system 10, such as a knee airbag assembly 20d and a frontal airbag 26d that protect a driver of the vehicle 14. The frontal airbag 26d is held within a steering wheel 42 of the vehicle 14.

The example airbag system 10 may include additional airbags, such as side airbags, seat belt airbags, etc.

Referring to FIGS. 3-12 with continuing reference to FIGS. 1 and 2, the airbag 22d, when not deployed, is positioned behind an airbag cover 46d. Similarly, the airbag 22p is positioned behind an airbag cover 46p. The outwardly facing surfaces of the airbag covers 46d and 46p are exposed and visible to the occupant 18.

The airbag covers 46d and 46p include tear seams 50, which are generally intentionally weakened areas of the airbag covers 46d and 46p. The tear seams 50 are typically not visible to the occupant.

The airbag, during deployment, separates the airbag cover 46d or 46p associated with the deploying airbag at the tear seams 50. The separation allows the deploying airbag to move through the airbag cover 46d or 46p and fully expand.

The airbag 22d is held within a housing 54d. The airbag 22p is held within a similar housing 54p. The housings 54d and 54p each define an open area 58 that receives the knee airbag 22d or 22p. The airbag housings 54d and 54p are secured to supports within the instrument panel 30.

To reduce complexity, the dimensions of the housing 54d are the same as the dimensions of the housing 54p. Accordingly, the housing 54d could be used in place of the housing 54p and vice versa.

Also, in this example, the structure of the airbag 22d is generally the same as the structure of the airbag 22p. The example airbag 22d is folded differently than the example airbag 22p, however.

Although the airbags 22p and 22d are similar, the cross-car position of the airbag 22d within the housing 54d is different than the cross-car position of the airbag 22p within the housing 54p. That is, the airbags 22d and 22p are not laterally centered within the housings 54d and 54p. In this example, the airbags 22d and 22p are positioned within the housings 54d and 54p close to ends of the housings 54d and 54p that face the center of vehicle 14.

Aligning the airbags 22d and 22p in these cross-car positions facilitates absorbing forces during a collision because these positions are laterally aligned with an in-position passenger and an in-position driver. Lateral, in this example, is with reference to a center of the vehicle 14.

As shown, the undeployed airbags 22d and 22p are laterally shorter than the housings 54d and 54p. Because the airbags 22d and 22p are positioned within the housings 54d and 54p near the center of the vehicle 14, laterally outer areas 58d and 58p of the housings 54d and 54p do not accommodate any of the airbags 22d and 22p. Because the airbags 22d and 22p do not extend into the laterally outer areas 58d and 58p, separating tear seams in these areas using the deploying airbags would be difficult. Accordingly, the tear seams 50 of the airbag covers 46*d* and 46*p* do not extend significantly into the laterally outer areas 58*d* and 58*p*.

As can be appreciated, the airbags 22*d* and 22*p* can become hung up on the airbag covers 46*d* and 46*p* if the airbags 22*d* and 22*p* are expanded laterally during deployment into these open, laterally outer areas 58*d* and 58*p*. Portions of the airbags 22*d* and 22*p* would essentially become stuck during deployment.

In this example, prior to deployment, the example airbags 22*d* and 22*p* are each held within a respective trajectory control envelope 62. During deployment, the trajectory control envelopes 62 limit expansion into the laterally outer areas 58*d* and 58*p*.

The example trajectory control envelopes 62 each include two bolt holes 66, a first stitched area 70, a second stitched area 74, and a tear seam 78. The bolt holes 66 receive a threaded fastener that secures the trajectory control envelope 62 relative to the housing 54*d* or 54*p*, and to the instrument panel 30. The second stitched area 74 limits deployment of the airbag 34 into the open area 58. The first stitched area 70 and the tear seam 78 encourage the airbag 34 to deploy through the trajectory control envelope 62 at the location of the tear seam 78. The housing 54*d* or 54*p* limits initial deployment of the airbag 22*d* or 22*p* toward the center of the vehicle 14.

In this example, the trajectory control envelope 62 holding the airbag 22*d* is the same as the trajectory control envelope 62 holding the airbag 22*p*. However, the surface of the trajectory control envelope on the passenger side that contacts the housing 54B is opposite the surface of the trajectory control envelope 62 that contacts the housing 54A on the driver side. As can be appreciated, using the same design reduces complexity.

In another example, unique trajectory control envelopes are used for the passenger side and driver side. The uniqueness may be due to the location of the tear seam moving from the portion of the trajectory control envelope directly opposite the first stitched area 70 to another location such as the location 80.

The example trajectory control envelopes 62 are made from a woven, coated fabric that influences how the airbags 22*d* and 22*p* deploy. In prior art, some airbags are wrapped with non-woven, uncoated fabric that does not influence deployment of the prior art airbags.

The example trajectory control envelopes 62 and the airbags 22*d* and 22*p* are made of the same material. Specifically, in this example, the trajectory control envelopes 62 and the airbags 22*d* and 22*p* are made from Toray 68114 470 dtex 20 gsm coating.

In other examples, the trajectory control envelopes 62, the airbags 22*d* and 22*p*, or both are made of a Tapex fabric having coated panels. For example, Toray 68114 470 dtex with a 20 gsm coating In still other examples, the trajectory control envelopes 62, the airbags 22*d* and 22*p*, or both are made of a GST/ITG fabric having coated panels. For example, ITG 28553 470 dtex 46×46 with a 25 gsm coating or ITG 28531 700 dtex 41×41 with a 35 gsm coating.

The trajectory control envelopes 62 provide resistance to the airbags 22*d* and 22*p* during deployment, which influences how the airbags 22*d* and 22*p* deploy. In this example, the trajectory control envelopes 62 prevent the airbags 22*d* and 22*p* from becoming hung up underneath the covers 46*d* and 46*p*.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A trajectory control envelope comprising:
a trajectory control envelope configured to receive an airbag and to control lateral deployment of the airbag wherein lateral deployment is cross-car deployment.

2. The trajectory control envelope of claim 1, wherein the trajectory control envelope and the airbag are held within a housing, the housing having an open area that does not hold the trajectory control envelope and the airbag, wherein the trajectory control envelope is configured to limit expansion of the airbag into the open area.

3. The trajectory control envelope of claim 2, wherein the open area is a laterally outer area of the housing relative to a centerline of a vehicle.

4. The trajectory control envelope of claim 3, including a stitched area that blocks expansion of the airbag into the open area.

5. The trajectory control envelope of claim 1, wherein the airbag is a knee airbag.

6. The trajectory control envelope of claim 1, wherein the trajectory control envelope includes a tear seam that is configured to tear as the airbag expands to allow the airbag to expand through the trajectory control envelope.

7. The trajectory control envelope of claim 1, wherein the trajectory control envelope is configured to control deployment of a driver side airbag or a passenger side airbag.

8. The trajectory control envelope of claim 1, wherein the trajectory control envelope comprises a woven material.

9. The trajectory control envelope of claim 1, including a first stitched area at a laterally outer edge of the trajectory control envelope, a tear seam on a first side of the trajectory control envelope, and a second stitched area at an opposing, second side of the trajectory control envelope.

10. An airbag assembly, comprising:
an airbag; and
a trajectory control envelope that receives the airbag, the trajectory control envelope extending laterally further than the airbag when the airbag is received within the trajectory control envelope, the trajectory control envelope configured to direct the airbag during deployment of the airbag;
wherein the trajectory control envelope are configured for receipt within a passenger side housing or a driver side housing;
wherein the airbag within the trajectory control envelope is folded in a first orientation when received within the passenger side housing, and the airbag within the trajectory control envelope is folded in a second orientation when received within the driver side housing.

11. The airbag assembly of claim 10, including a housing that receives the airbag and the trajectory control envelope.

12. The airbag assembly of claim 11, wherein the airbag in an undeployed position is laterally shorter than the housing such that the housing has an open area when receiving the airbag and the trajectory control envelope, the trajectory control envelope configured to limit expansion of the airbag into the open area.

13. The airbag assembly of claim 10, wherein the airbag is a knee airbag.

14. A method of airbag deployment control, comprising:
deploying an airbag;

directing the deployment of the airbag to a desired area using a trajectory control envelope; and limiting lateral deployment with the trajectory control envelope during the deploying wherein lateral deployment is cross-car deployment.

15. The method of claim 14, inserting the airbag within the trajectory control envelope prior to the deploying.

16. The method of claim 14, including deploying the airbag through a tear seam in the trajectory control envelope.

17. The method of claim 14, including cushioning an occupant knee with the deployed airbag.

18. The method of claim 14, wherein the trajectory control envelope can be used to direct a passenger side airbag or a driver side airbag.

* * * * *